(12) United States Patent
Sakakibara et al.

(10) Patent No.: US 7,405,873 B2
(45) Date of Patent: Jul. 29, 2008

(54) UV-BANDPASS FILTER AND APPLICATION TO UV-DETECTING APPARATUS OR LIGHT-EMITTING APPARATUS

(75) Inventors: Masayuki Sakakibara, Hamamatsu (JP); Masaru Morishita, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 22 days.

(21) Appl. No.: 10/493,845
(22) PCT Filed: Jun. 20, 2002
(86) PCT No.: PCT/JP02/06182

§ 371 (c)(1),
(2), (4) Date: Oct. 21, 2004

(87) PCT Pub. No.: WO03/038483

PCT Pub. Date: May 8, 2003

(65) Prior Publication Data

US 2005/0063045 A1    Mar. 24, 2005

(30) Foreign Application Priority Data

Oct. 31, 2001   (JP) ............................ 2001-335392

(51) Int. Cl.
*F21V 9/06* (2006.01)
(52) U.S. Cl. ...................... 359/360; 359/584; 359/585; 359/589; 359/839; 252/588
(58) Field of Classification Search .................. None
See application file for complete search history.

(56) References Cited

U.S. PATENT DOCUMENTS 4,799,745 A * 1/1989 Meyer et al. ............... 359/360
5,183,700 A * 2/1993 Austin ...................... 428/216
5,276,600 A * 1/1994 Takase et al. .............. 362/320
5,361,172 A * 11/1994 Schissel et al. ............ 359/883
6,587,263 B1 * 7/2003 Iacovangelo et al. ....... 359/359

FOREIGN PATENT DOCUMENTS

| JP | 51-131340 | 11/1976 |
| JP | 60-252303 | 12/1985 |
| JP | 2000-180615 | 6/2000 |

OTHER PUBLICATIONS

Tech. Phys. Lett. vol. 19, No. 3, pp. 171-173 "Structural Phase Transition in Silver Oxide Microcrystals" V.A. Voll and A.V. Struts, 1992.

(Continued)

*Primary Examiner*—Stephone B. Allen
*Assistant Examiner*—Derek S Chapel
(74) *Attorney, Agent, or Firm*—Drinker Biddle & Reath LLP

(57) ABSTRACT

A UV-bandpass filter for transmitting therethrough light having a wavelength included in a UV-region. The bandpass filter is an optical filter including a thin silver film; wherein the thin silver film includes an entrance face and an exit face opposing the entrance face, for emitting light having a wavelength included in a specific UV-region whose wavelength ranges from 250 nm to 400 nm in the light having reached the entrance face, and has such a thickness as to yield a transmittance of 10% or less with respect to light having a wavelength excluding the specific UV-region.

5 Claims, 14 Drawing Sheets

OTHER PUBLICATIONS

"Single Films and Heat Mirrors Produced by Plasma Ion Assisted Deposition" J.K. Fu et al. pp. 403-410, 1997.

"Numerical and Experimental Study of A-SI:H Based Ultraviolet Sensitive Detectors" Marko Jankovec et al. pp. 1229-1233, 2002.

"Heat Treatment and Bending of Low-E Glass" J.J. Finley, pp. 264-273, 1999.

"Photo-Induced Dissolution Effect in Ag/AS33 S67 Multilayer Structures and its Potential Application" T. Wagner et al. pp. 979-984, 2000.

Silver-Based Low-Emissivity Coating for Architectural Windows: Optical and Structural Properties, R.J. Martin-Palma et al. pp. 55-66, 1998.

Schott Corp. Catalog No. 3555elx/84 "Optical Glass Filters", (including cover page, index pp. 3-4, and p. 120, along with data sheets of samples UG1, UG5, and UG11), 2006.

J. Casset, "Transmission Optique de Lames Minces Sans Support de Metaux Nobles Dans le Visible et le Proche Ultraviolet," Thin Solid Films, vol. 18, 1973, pp. 99-103.

* cited by examiner

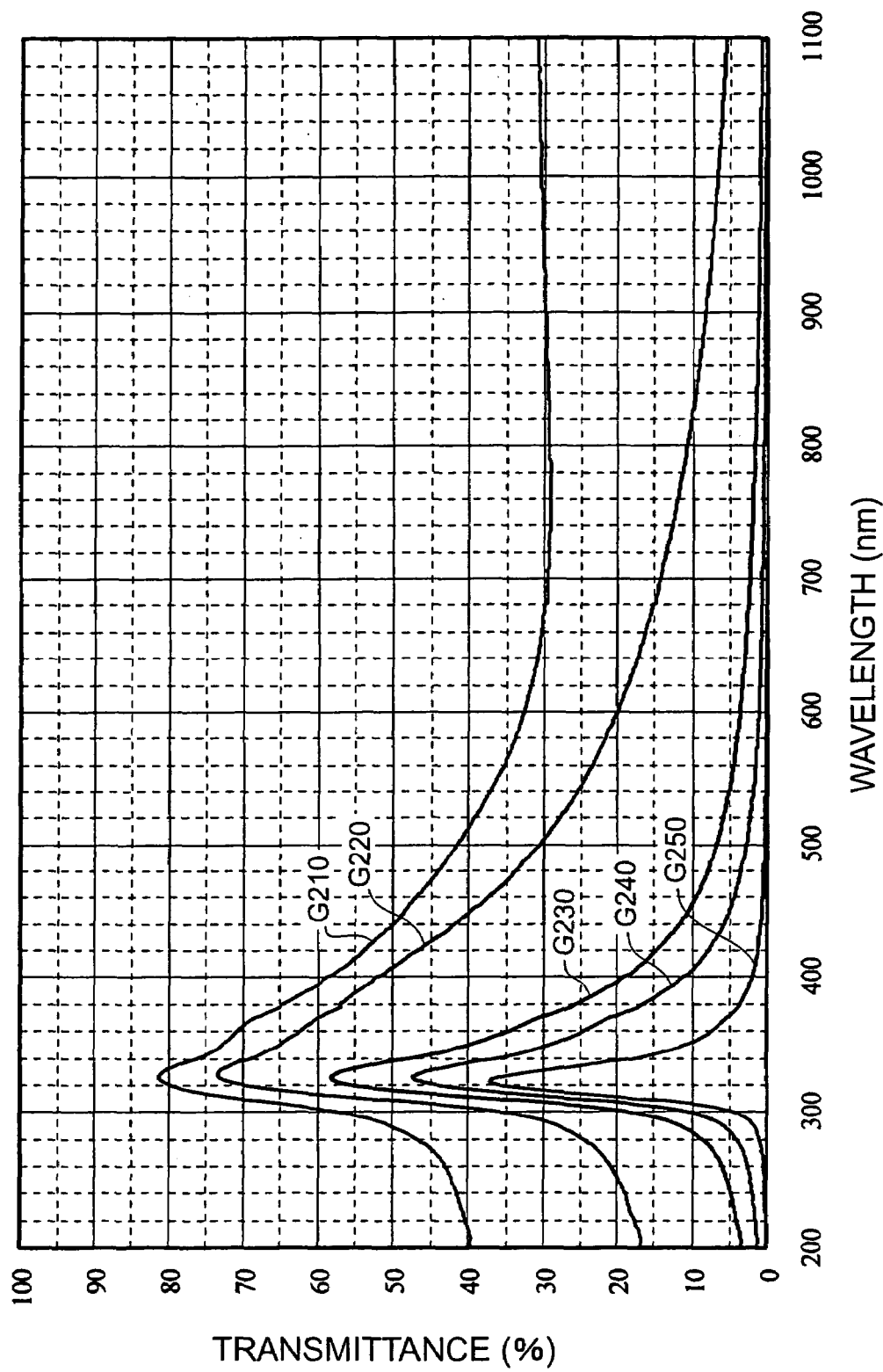

UV-BANDPASS FILTER AND APPLICATION TO UV-DETECTING APPARATUS OR LIGHT-EMITTING APPARATUS

TECHNICAL FIELD

The present invention relates to a UV-bandpass filter which selectively transmits therethrough light having a wavelength included in a UV-region, a UV-detecting apparatus including the same, and a UV source (light-emitting apparatus) including the same.

BACKGROUND ART

Conventionally known as an optical filter having a transmission characteristic with respect to light in a UV-region is, for example, one made by SCHOTT Corporation (catalog number: 3555eIX/84) having transmission characteristics such as those shown in FIG. 1. While FIG. 1 shows transmission characteristics of four kinds of optical filters, each tends to exhibit transmission peaks in both UV- and IR-regions.

On the other hand, silver films have been known to exhibit excellent spectral reflection characteristics with respect to light excluding the UV-region. Known as an optical filter utilizing such a silver film is, for example, one using a silver film as a reflecting mirror disclosed in Japanese Patent Application Laid-Open No. SHO 60-252303. This optical filter comprises such a structure that the silver film absorbs light in the UV-region but reflects light in the other wavelength regions, whereas light in the IR-region from the reflected light is blocked by use of a prism, so as to detect visible light.

DISCLOSURE OF THE INVENTION

The inventors studied conventional optical filters and, as a result, have found the following problems. Namely, while optical filters having transmission characteristics such as those shown in FIG. 1 surely exhibit an excellent transmission characteristic with respect to light in the UV-region, they also exhibit a transmission characteristic with respect to light in the IR-region near a wavelength of 700 nm. When an optical filter having such transmission characteristics is utilized in an inexpensive light-receiving device mainly made of silicon, for example, having a light-receiving sensitivity up to near 1000 nm so as to be employed in a UV-detecting apparatus for detecting light included in the UV-region, UV-rays are hard to detect due to the transmission of light in the IR-region.

Though the optical filter disclosed in Japanese Patent Application Laid-Open No. SHO 60-252303 utilizes a silver film as a reflecting mirror, it merely eliminates light in the UV-region by absorption, and is hard to apply to UV-detecting apparatus for detecting light in the UV-region.

The inventors have found that a single silver layer having an excellent transmission characteristic with respect to only light in a specific wavelength region included in the UV-region in a wide wavelength band ranging at least from 200 nm to 3000 nm can be obtained when transmission characteristics of a thin silver film is appropriately regulated by controlling its thickness, thereby achieving the present invention, whose object is to provide a UV-bandpass filter comprising a structure having an excellent wavelength selectivity with a simple configuration while enabling wide applications, a UV-detecting apparatus including the same, and a UV source (light-emitting apparatus) including the same.

The UV-bandpass filter according to the present invention is an optical filter for selectively transmitting therethrough light having a wavelength included in a specific UV-region having a wavelength ranging from 200 nm to 400 nm, preferably a wavelength ranging from 250 nm to 400 nm, more preferably a wavelength ranging from 300 nm to 360 nm, while absorbing or reflecting light having a wavelength excluding the specific UV-region, wherein the UV-bandpass filter includes a thin silver film comprising an entrance face and an exit face opposing the entrance face, for emitting the light having a wavelength included in the specific UV-region in the light having reached the entrance face, and reduces the ratio of light excluding the UV-region to 10% or less in the transmitted light emitted from the exit face.

In particular, the thin silver film has such a thickness as to exhibit a transmittance of 10% or less, preferably 5% or less, with respect to light having a wavelength excluding the specific UV-region. Namely, the inventors have found it necessary to suppress the transmittance for light having a wavelength of 400 nm or more to a value of 10% or less, preferably 5% or less, in order to make it possible to detect UV-rays, which necessitates a film thickness of 70 nm or more, preferably 80 nm or more. On the other hand, the inventors have found that a film thickness of 250 nm or less is required since it is necessary to secure a transmittance of 5% or more with respect to light in the above-mentioned specific UV-region in view of the light-receiving sensitivity of UV detectors.

Further, the UV-bandpass filter according to the present invention may be constituted by a member transparent to at least UV-rays (UV-transmitting member) prepared as a reinforcement member, and a thin silver film formed on a surface of the UV-transmitting member. When the UV-bandpass filter and a light-receiving device are combined together, a UV-detecting apparatus is obtained. In this case, the thin silver film is directly or indirectly formed on a light entrance face of the light-receiving device. For example, when the light-receiving device has an entrance faceplate, the thin silver film may be formed on the entrance faceplate as well (whereby the entrance faceplate functions as a reinforcement member for the thin silver film).

Furthermore, when the UV-bandpass filter and a light-emitting device are combined together, a UV source (light-emitting apparatus) is obtained. In this case, the thin silver film is directly or indirectly formed on a light exit face of the UV source. For example, when the light-emitting device comprises an envelope which transmits light therethrough, the thin silver film maybe formed on a surface of the envelope (whereby the envelope itself functions as a reinforcement member for the thin silver film).

Embodiments according to the present invention will become more fully understood from the detailed description given hereinbelow and the accompanying drawings. These embodiments are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

BRIEF DESCRIPTION OF THE DRAWINGS

FIG. 3 is a graph showing respective wavelength dependence characteristics of transmittance in five kinds of thin silver films having thicknesses (12.8 nm to 78.4 nm) different from each other;

BEST MODES FOR CARRYING OUT THE INVENTION

In the following, embodiments of the UV-bandpass filter, UV-detecting apparatus, and light-emitting apparatus according to the present invention will be explained in detail with reference to FIGS. 2A to 2C, 3 to 9, 10A, 10B, 11 to 13, 14A, and 14B. In the explanation of the drawings, identical members and parts will be referred to with identical numbers without repeating their overlapping descriptions.

UV-bandpass Filter

Figure 1:
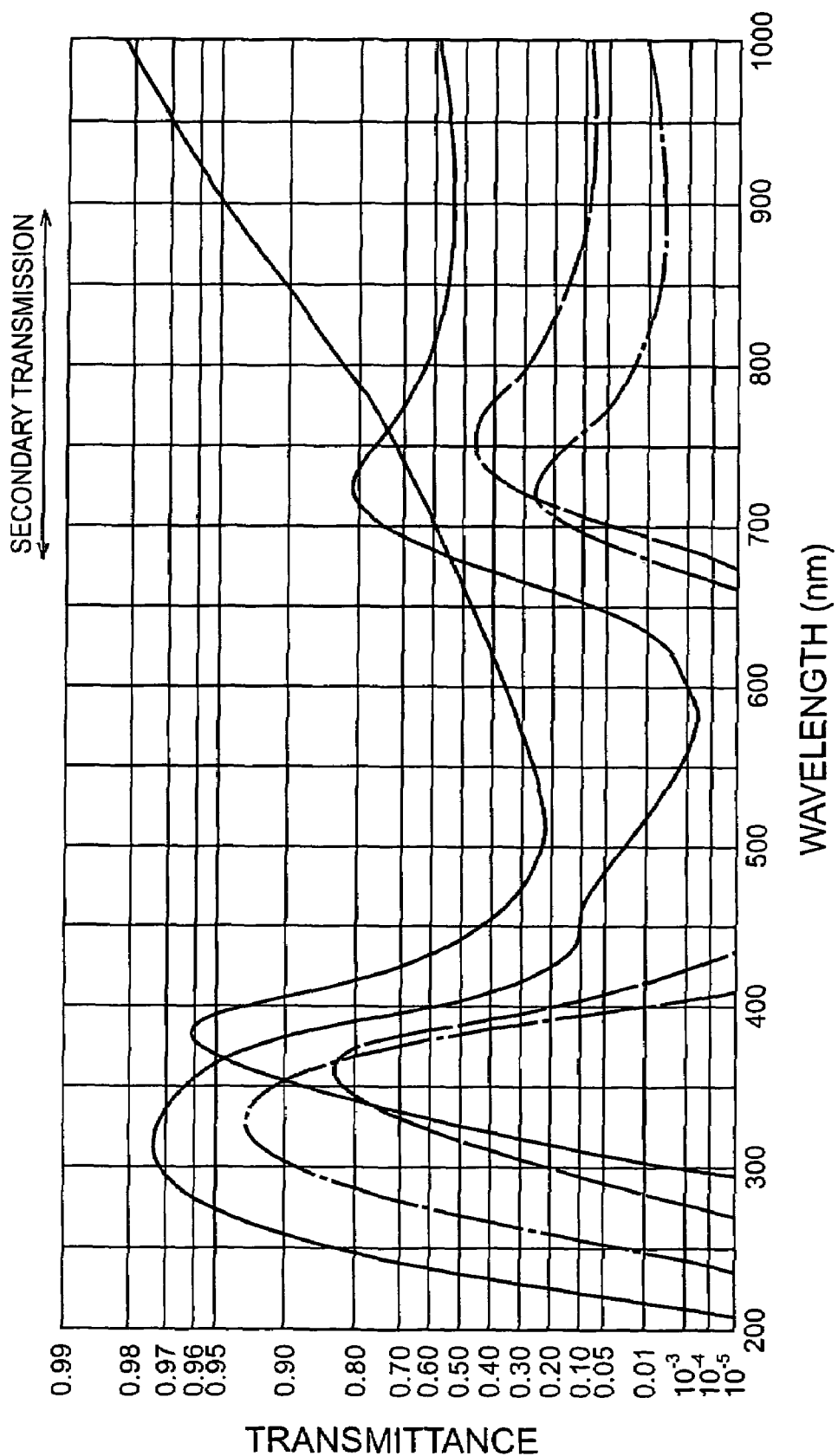
FIG. 1 is a chart showing transmission characteristics of typical UV-bandpass filters.
Figure 2A:
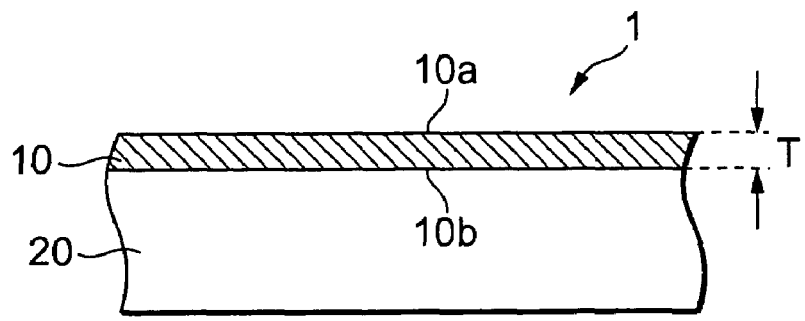
FIGS. 2A to 2C are views showing respective structures of first to third embodiments of the UV-bandpass filter according to the present invention.
Figure 2B:
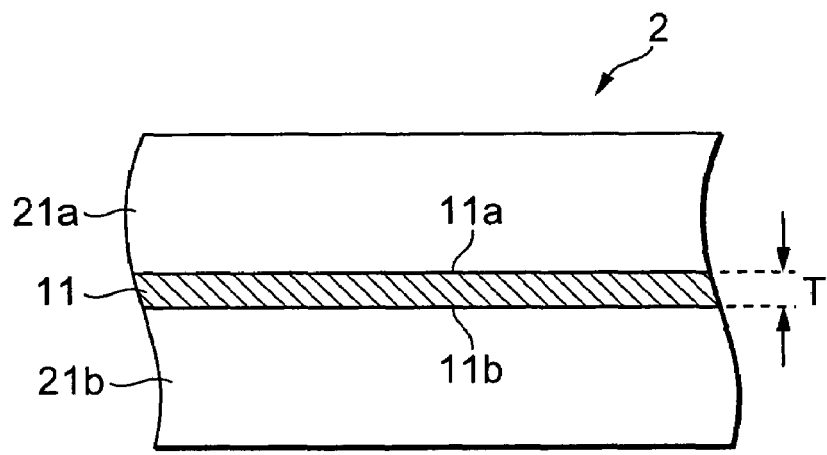
Figure 2C:
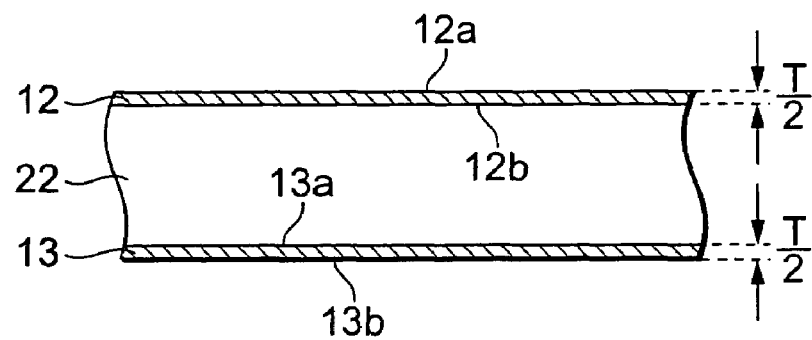

FIGS. 2A to 2C are views showing respective structures of first to third embodiments of the UV-bandpass filter according to the present invention. The UV-bandpass filter 1 according to the first embodiment shown in FIG. 2A comprises a UV-transmitting member 20, such as acrylic resin or silica glass, transparent to UV-rays and a thin silver film 10 having a thickness T (formable upon vapor deposition, for example) formed on a surface of the UV-transmitting member 20. The thin silver film 10 comprises an entrance face 10a and an exit face 10b for emitting light in a specific UV-region having a wavelength ranging from 200 nm to 400 nm, preferably a wavelength ranging from 250 nm to 400 nm, more preferably a wavelength ranging from 300 nm to 360 nm, in the light having reached the entrance face 10a. In the UV-bandpass filter 1 according to the present invention, the thin silver film 10 has a thickness T of 70 nm or more, preferably 80 nm or less, so as to suppress the transmittance with respect to light having wavelengths excluding the specific UV-region to 10% or less, preferably 5% or less. On the other hand, it is necessary for the thickness T of the thin silver film 10 to be set to 250 nm or less in order to secure a transmittance of 5% or more with respect to light having a wavelength included in the specific UV-region.

The UV-bandpass filter 2 according to the second embodiment shown in FIG. 2B comprises a thin silver film 11 having a thickness T, while having a laminate structure in which a UV-transmitting member 21a and a UV-transmitting member 21b are in contact with the entrance face 11a and exit face 11b of the thin silver film 11, respectively. The UV-bandpass filter 2 according to the second embodiment is obtained when a surface of one of the UV-transmitting members 21a, 21b is formed with the thin silver film 11 and then the UV-transmitting members 21a, 21b are arranged so as to sandwitch thus formed thin silver film 11.

The thin silver film 10 has a thickness T of 70 nm or more, preferably 80 nm or more, so as to suppress the transmittance with respect to light having wavelengths excluding the specific UV-region to 10% or less, preferably 5% or less, in the UV-bandpass filter 2 according to the second embodiment as well. On the other hand, it is necessary for the thickness T of the thin silver film 10 to be set to 250 nm or less in order to secure a transmittance of 5% or more with respect to light having a wavelength included in the specific UV-region.

The UV-bandpass filter 3 according to the third embodiment shown in FIG. 2C comprises a UV-transmitting member 22 and thin silver films 12, 13, each having a thickness T/2, formed on opposite main faces of the UV-transmitting member 22. The thin silver film 12 comprises an entrance face 12a and an exit face 12b for emitting light in the UV-region in the light having reached the entrance face 12a. On the other hand, the thin silver film 13 comprises an entrance face 13a and an exit face 13b for emitting light in the UV-region in the light having reached the entrance face 13a. It is not always necessary for the thin silver films 12, 13 to have the same thickness as long as their total thickness is T. Also, the number of thin silver films is not limited to 2 (the laminate structure may have two or more thin silver films having a total thickness of T).

The total thickness (T) of the thin silver films 12, 13 is designed so as to become 70 nm or more, preferably 80 nm or more, in order to suppress the transmittance with respect to light having wavelengths excluding the specific UV-region to 10% or less, preferably 5% or less. On the other hand, it is necessary for the total thickness T to be set to 250 nm or less in order to secure a transmittance of 5% or more with respect to light having a wavelength included in the specific UV-region.

The inventors prepared 11 kinds of samples having respective thicknesses (12.8 nm to 400.0 nm) different from each other, and measured transmission characteristics of these samples. Each of thus prepared samples comprised a structure similar to that of the UV-bandpass filter 1 according to the first embodiment shown in FIG. 2A, and was made by forming a thin silver film with a predetermined thickness on a surface of silica glass. FIG. 3 is a graph showing wavelength dependence characteristics concerning five kinds of thin silver films having thicknesses of 12.8 nm, 28.8 nm, 46.4 nm, 59.2 nm, and 78.4 nm, respectively; whereas FIG. 5 is a graph showing wavelength dependence characteristics concerning six kinds of thin silver films having thicknesses of 80.4 nm, 106.4 nm, 135.2 nm, 160.8 nm, 241.2 nm, and 400.0 nm, respectively.

Figure 4:
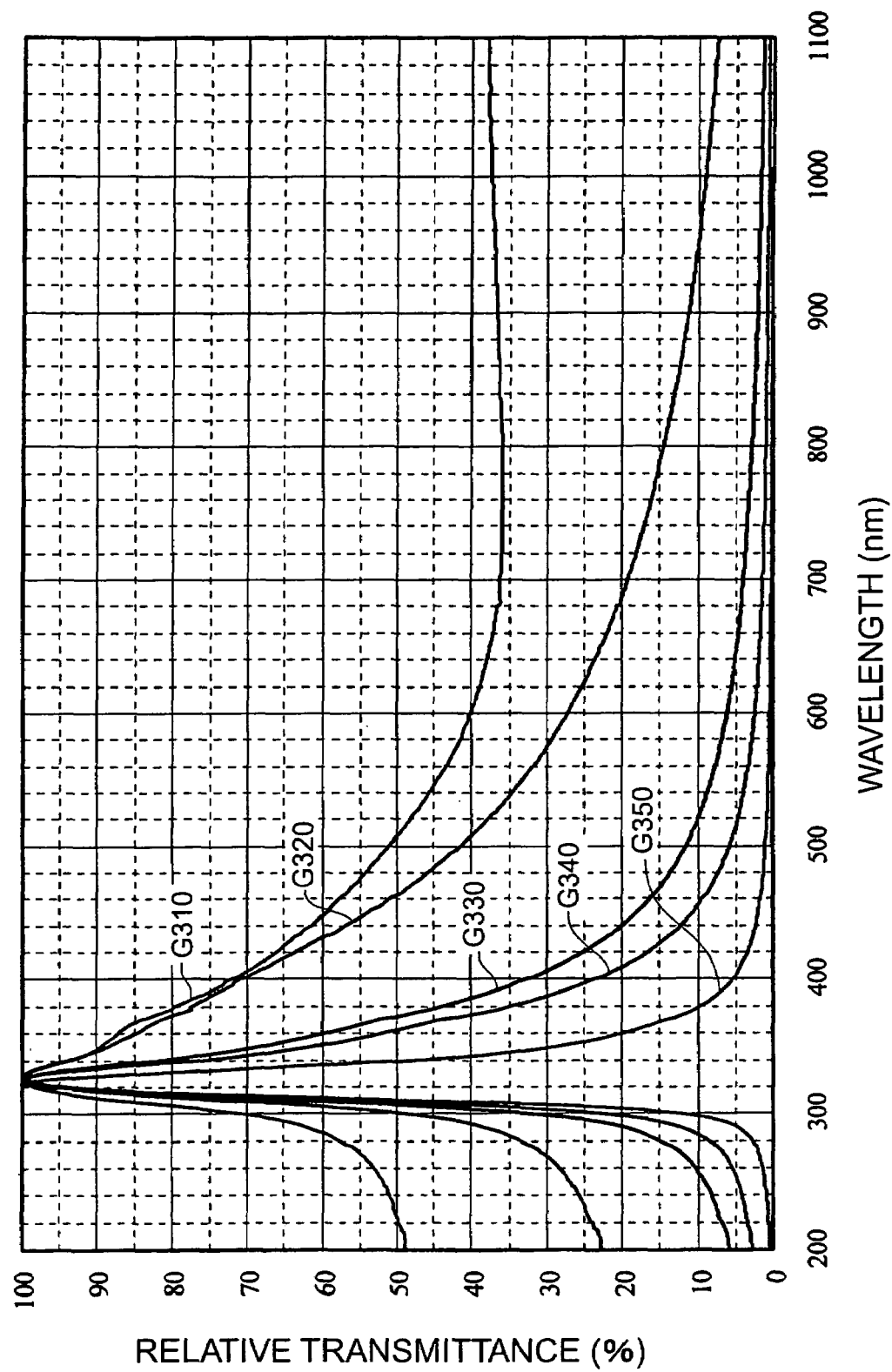
FIG. 4 is a graph showing respective wavelength dependence characteristics of transmittance in the five kinds of thin silver films shown in FIG. 3 when their maximum transmittances are taken as 100%.

In FIG. 3, curves G210, G220, G230, G240, and G250 show wavelength dependence characteristics of transmittance concerning thin silver films having thicknesses of 12.8 nm, 28.8 nm, 46.4 nm, 59.2 nm, and 78.4 nm, respectively. FIG. 4 is a graph showing respective wavelength dependence characteristics of relative transmittance in the five kinds of thin silver films shown in FIG. 3 when their maximum transmittances are taken as 100%, in which curves G310, G320, G330, G340, and G350 correspond to curves G210, G220, G230, G240, and G250 in FIG. 3, respectively.

Figure 5:
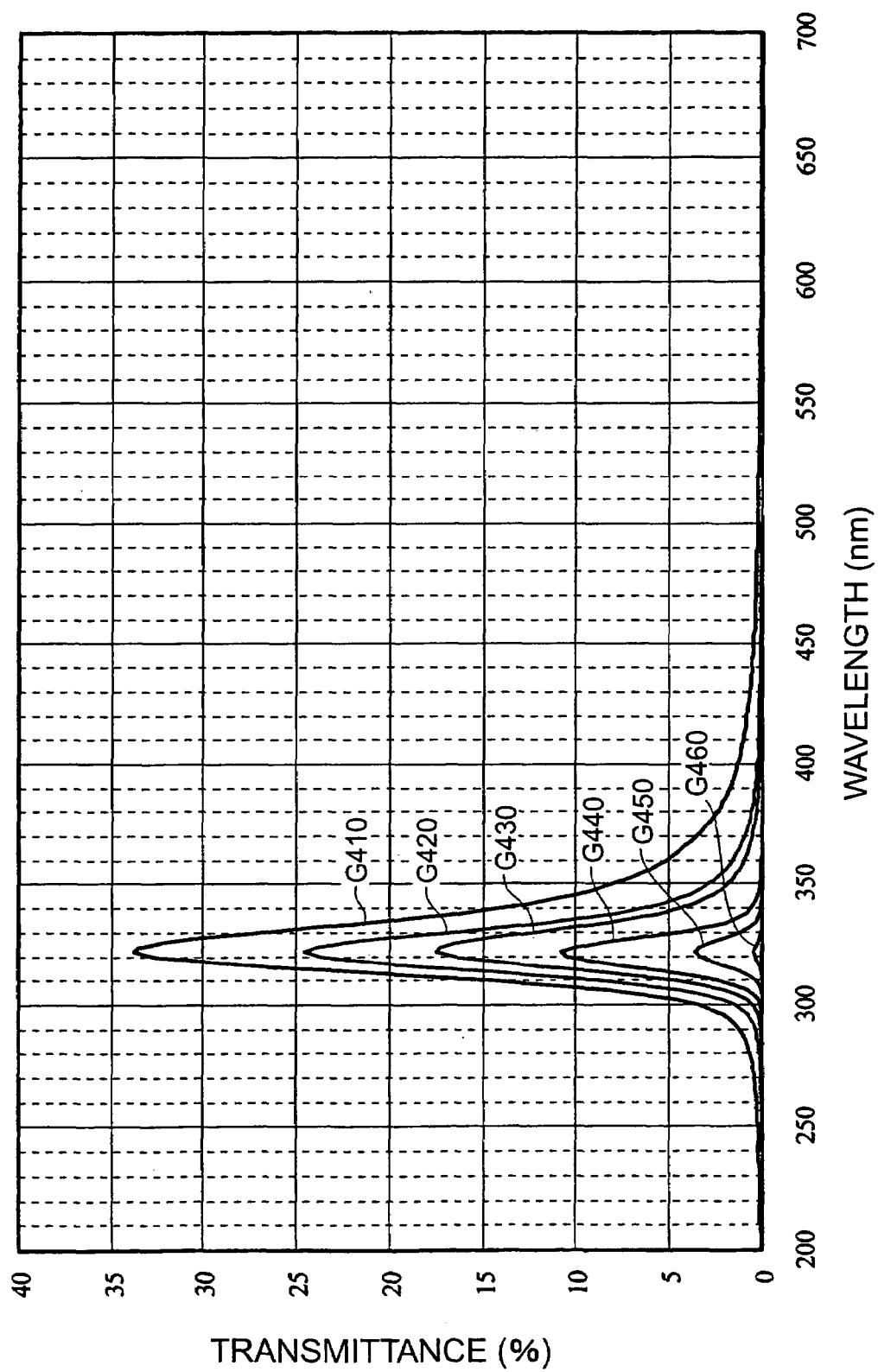
FIG. 5 is a graph showing respective wavelength dependence characteristics of transmittance in six kinds of thin silver films having thicknesses (80.4 nm to 400.0 nm) different from each other.
Figure 6:
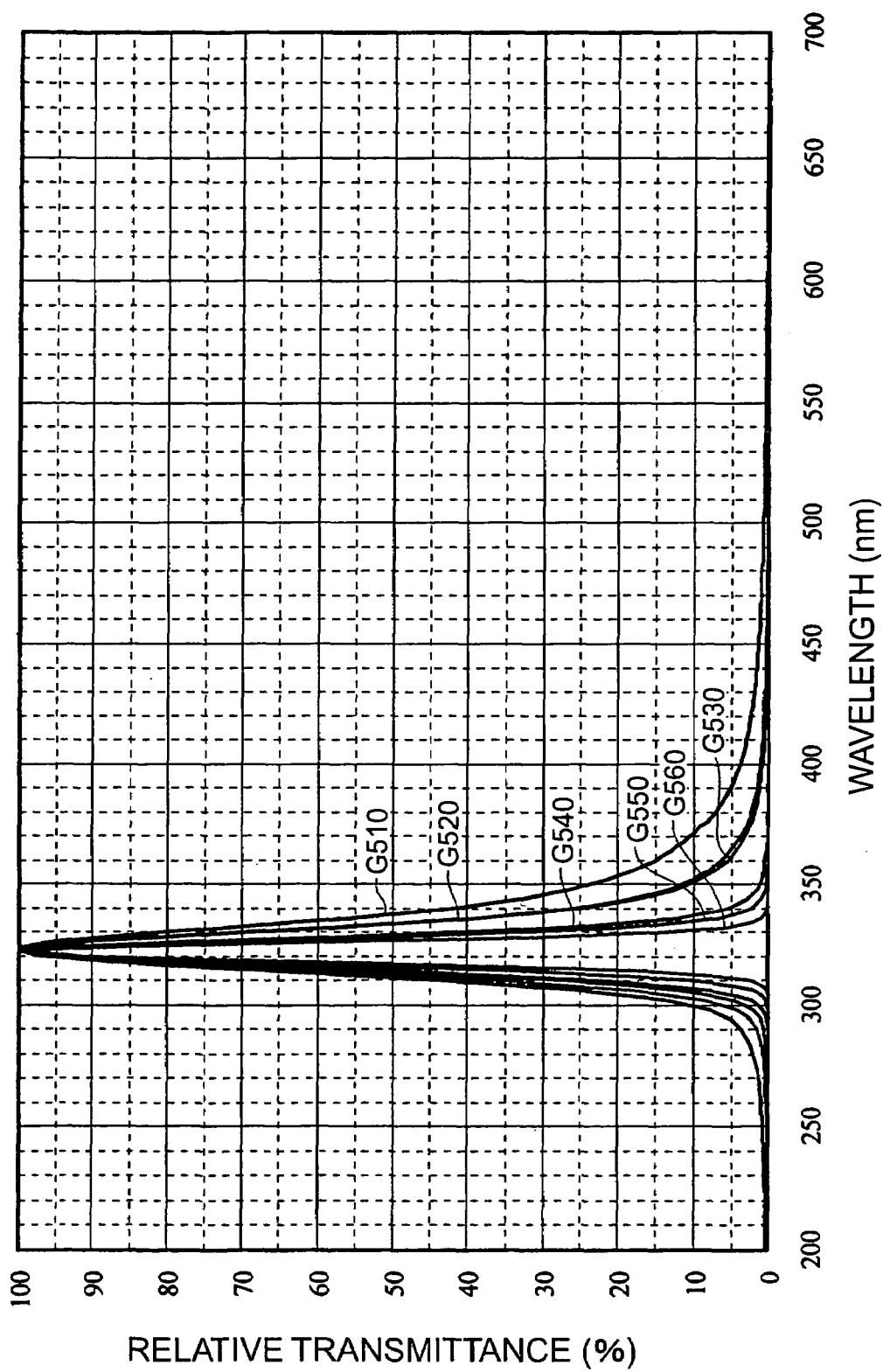
FIG. 6 is a graph showing respective wavelength dependence characteristics of transmittance in the six kinds of thin silver films shown in FIG. 5 when their maximum transmittances are taken as 100%.

In FIG. 5, curves G410, G420, G430, G440, G450, and G460 show wavelength dependence characteristics of transmittance concerning thin silver films having thicknesses of 80.4 nm, 106.4 nm, 135.2 nm, 160.8 nm, 241.2 nm, and 400.0 nm, respectively. FIG. 6 is a graph showing respective wavelength dependence characteristics of relative transmittance in the six kinds of thin silver films shown in FIG. 5 when their maximum transmittances are taken as 100%, in which curves G510, G520, G530, G540, G550, and G560 correspond to curves G410, G420, G430, G440, G450, and G460 in FIG. 5, respectively.

As can be seen from the curves shown in FIGS. 3 to 6, each of the 11 kinds of prepared samples has a transmission characteristic in which only one peak exists at a wavelength of 322 nm in the wavelength band of 200 nm to 1000 nm. According to the measurement conducted by the inventors, only one transmission peak exists even in the wavelength band of 200 nm to 3000 nm. When a thin silver film is employed in a UV-bandpass filter, it is necessary for the thin silver film to have a sufficient transmission characteristic with respect to light having a wavelength included in the UV-region (UV-rays) while having a sufficient blocking characteristic with respect to light having wavelengths excluding the UV-region.

Figure 7:
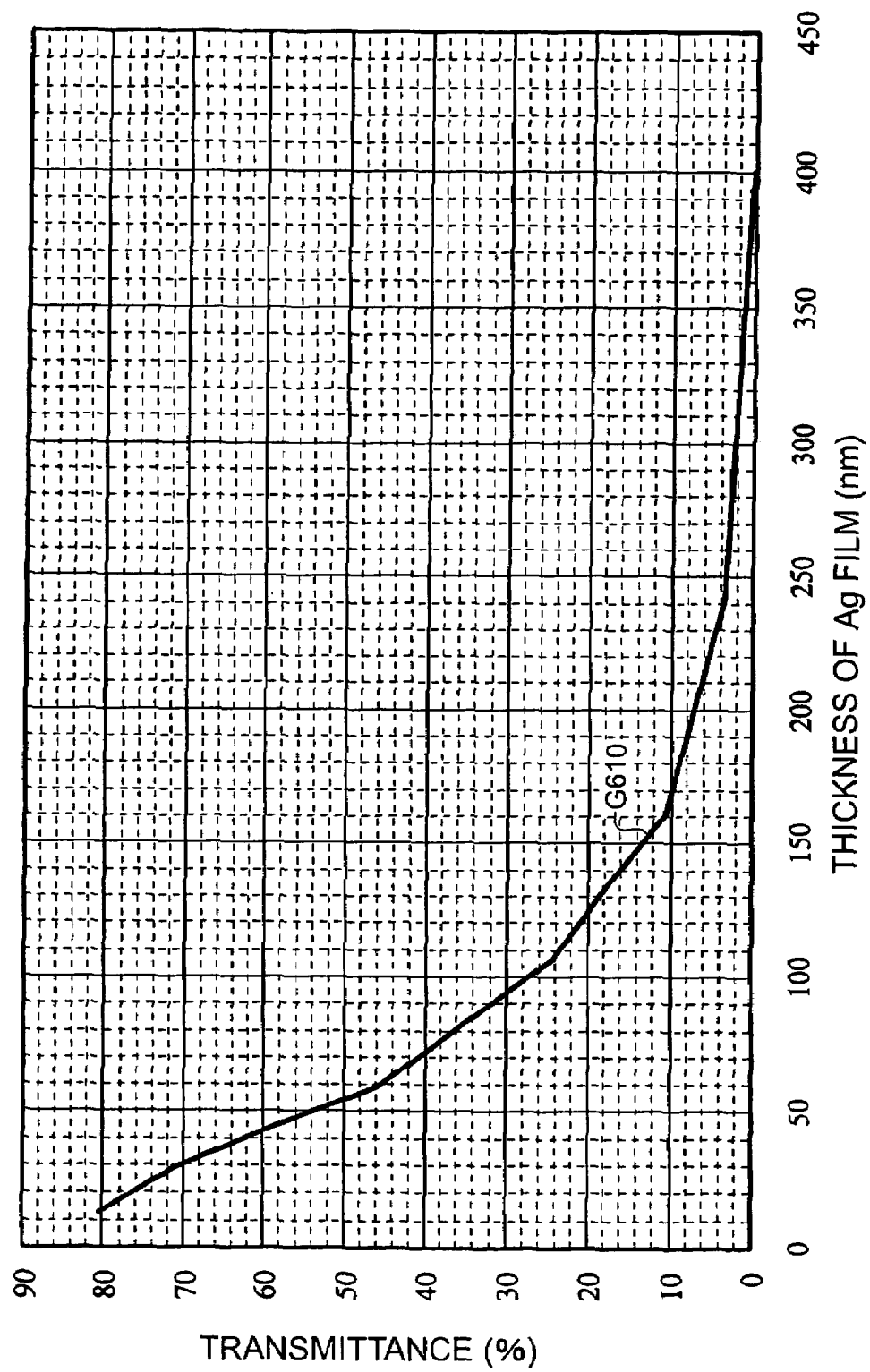
FIG. 7 is a graph showing respective relationships between the thickness of a thin silver film and its transmittance with respect to light having a wavelength of 322 nm (transmission peak wavelength)

Therefore, the inventors studied the relationship between film thickness (Ag film thickness) and transmittance concerning light having a wavelength of 322 nm which is the transmission peak wavelength of the thin silver film. In FIG. 7, curve G610 shows the relationship between thickness and transmittance of a thin silver film with respect to light having a wavelength of 322 nm (transmission peak wavelength) As can be seen from this curve G610, while the maximum transmission amount of the thin silver film decreases as the film thickness increases, a transmittance of at least 5% is required to be secured in order to make it possible for the light transmitted through the thin silver film (UV-rays) to be received by photodetectors. From this fact, it is seen that the maximum thickness of a thin silver film suitable for a UV-bandpass filter is preferably 250 nm or less.

Figure 8:
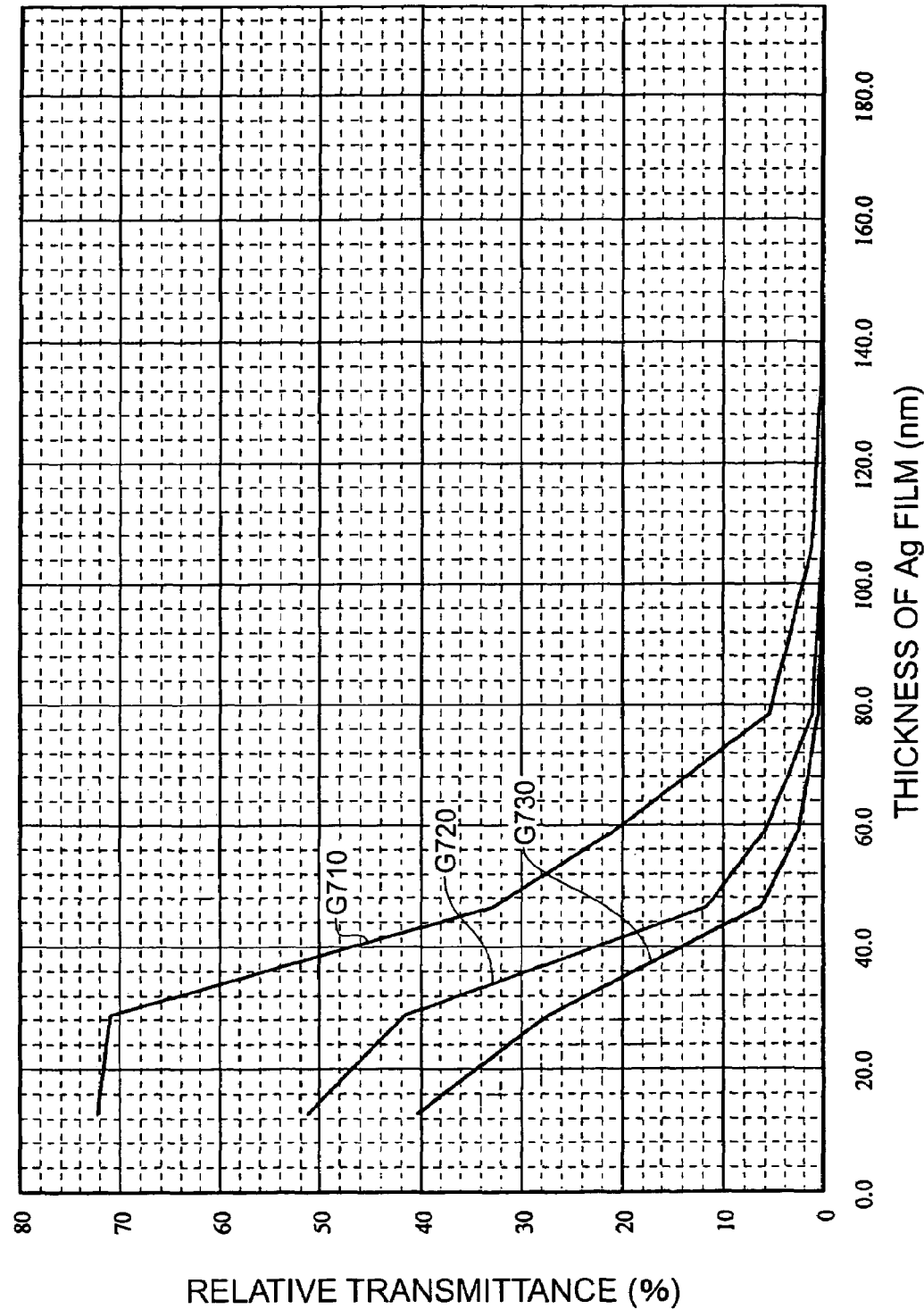
FIG. 8 is a graph showing respective relationships between the thickness of a thin silver film and the relative transmittance with respect to a plurality of wavelengths (400 nm, 500 nm, and 600 nm) of light with reference to the maximum transmittance at a transmission peak wavelength of 322 nm.

On the other hand, FIG. 8 is a graph showing respective relationships between thickness and relative transmittance with respect to a plurality of wavelengths (400 nm, 500 nm, and 600 nm) of light. In FIG. 8, the relative transmittance is a transmittance with reference to the maximum transmittance (taken as 100%) at a transmission peak wavelength of 322 nm. In FIG. 8, curves G710, G720, and G730 show relationships between thickness and relative transmittance with respect to light having wavelengths of 400 nm, 500 nm, and 600 nm, respectively. In order for a thin silver film to function as a UV-bandpass filter, it is necessary for at least the transmittance with respect to light having a wavelength of 400 nm or longer to be suppressed to 10% or less, preferably 5% or less. As a consequence, it is seen that the minimum thickness of a thin silver film suitable for a UV-bandpass filter is required to be 70 nm or more, preferably 80 nm or more.

Figure 9:
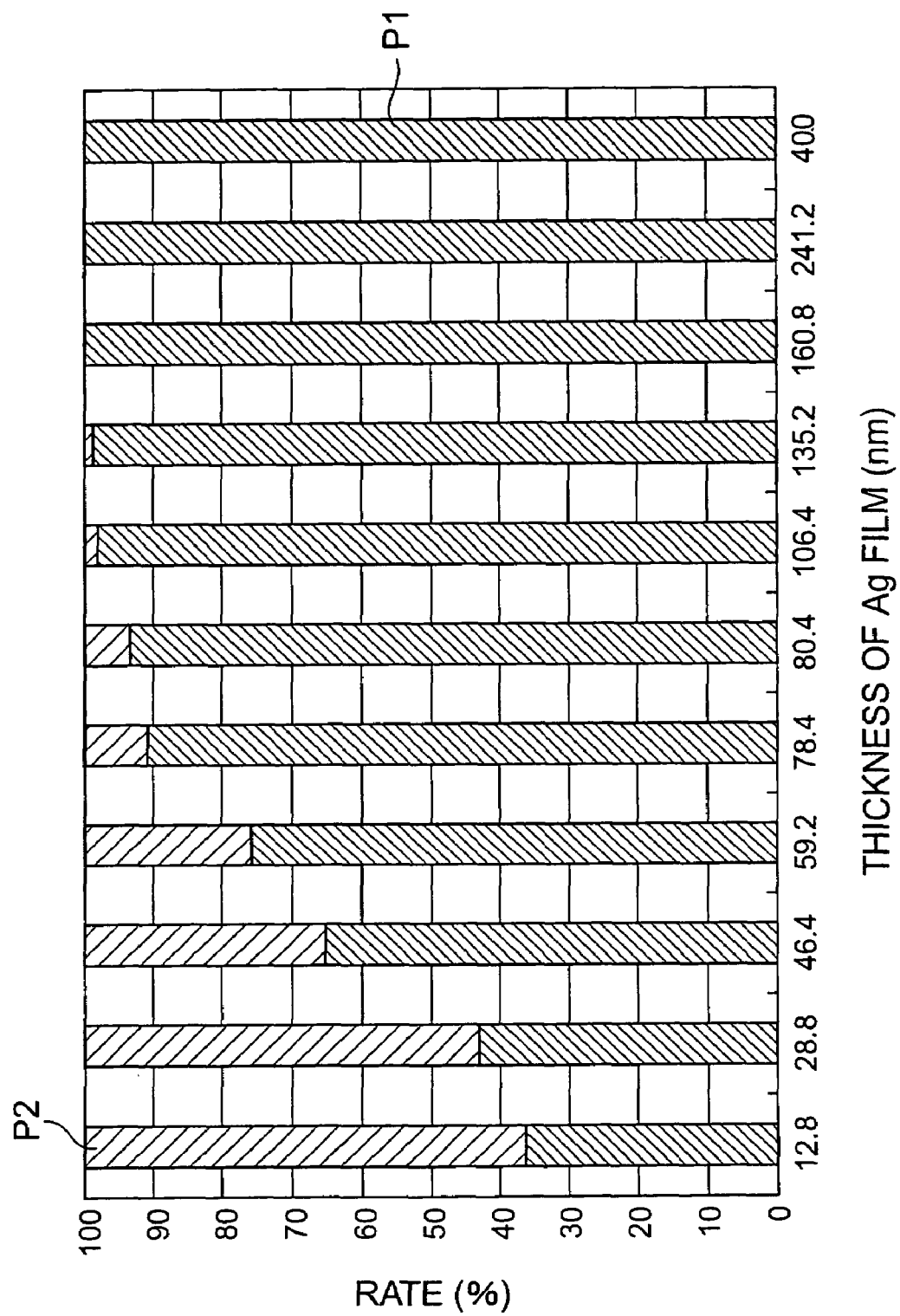
FIG. 9 is a graph showing the ratio between transmittance of the UV-region (200 nm or more but 400 nm or less) and transmittance of wavelength (longer than 400 nm but 1000 nm or less) excluding the UV-region in the whole transmittance.

FIG. 9 is a graph showing the ratio between transmittance of the UV-region (200 nm or more but 400 nm or less) and transmittance of wavelength (longer than 400 nm but 1000 nm or less) excluding the UV-region in the whole transmittance (measured in the wavelength range of 200 nm to 1000 nm) concerning a plurality of samples having film thicknesses (Ag film thicknesses) different from each other. In the graph shown in FIG. 9, region P1 indicates the ratio of transmittance in the UV-region, whereas region P2 shows the ratio of transmission of wavelengths excluding the UV-region. As can be seen from this graph, the ratio of wavelengths excluding the UV-region in the whole transmittance can be reduced to 10% or less if the film thickness is 70 nm or more, preferably 80 nm or more (the ratio of transmittance of wavelengths excluding the UV-region in the whole transmittance decreases to $1/10000$ or less if the film thickness is about 240 nm).

UV-detecting Apparatus

Figure 10A:
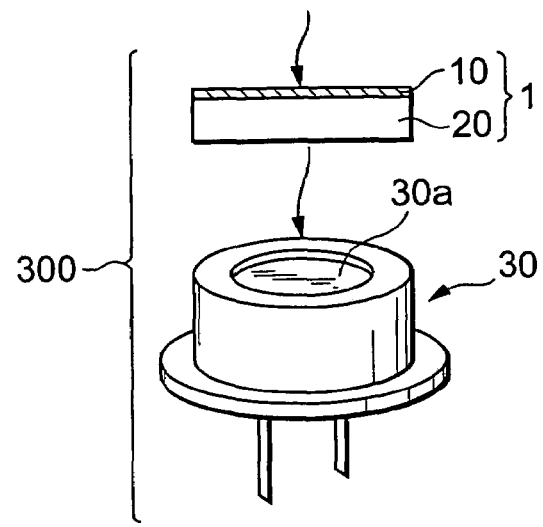
FIGS. 10A and 10B are views showing the exterior and sectional structure of first and second embodiments (applied examples of the UV-bandpass filter according to the present invention) in the UV-detecting apparatus according to the present invention, respectively.
Figure 10B:
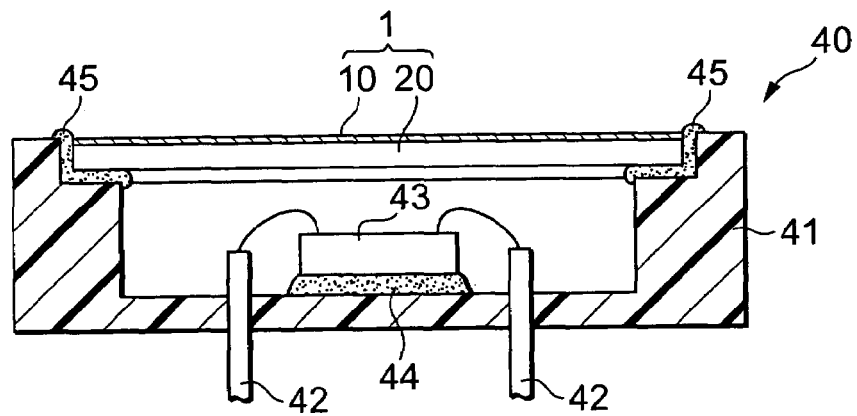

As in the foregoing, the UV-bandpass filter according to the present invention is constituted by a single silver layer regulated so as to have a predetermined thickness, whereby it can be combined with various kinds of optical devices such as light-receiving devices and light-emitting device. In the following explanation, a UV-detecting apparatus employing the UV-bandpass filter according to the present invention will mainly be explained. FIGS. 10A and 10B are views showing the exterior and sectional structure of first and second embodiments in the UV-detecting apparatus according to the present invention, respectively.

The UV-detecting apparatus 300 according to the first embodiment comprises the simplest structure as shown in FIG. 10A, and is constituted by a UV-bandpass filter 1 such as the one shown in FIG. 2A, and a commercially available photodiode 30 (of can type). Though the UV-detecting apparatus 300 according to the first embodiment employs the UV-bandpass filter 1 having a thin silver film 10 formed on a UV-transmitting member 20 acting as a reinforcement plate, the thin silver film 10 may be formed on a surface 30a facing the photodiode 30 as well.

FIG. 10B is a view showing the sectional structure of the UV-detecting apparatus 40 according to the second embodiment, in which the UV-bandpass filter 1 shown in FIG. 2A is employed as an entrance faceplate. The UV-detecting apparatus 40 according to the second embodiment comprises a ceramic case 41, leadpins 42 penetrating through the bottom part of the case 41, a photodiode 43 bonded to the bottom part of the case 41 with the aid of a die-bonding material 44, and an entrance faceplate (corresponding to the UV-bandpass filter 1) secured to the opening part of the case 41 by a silicone resin adhesive 45. Though the material of the case 41 is ceramic in the UV-detecting apparatus 40 according to the second embodiment, it may be a resin or metal as well. The photodiode 43 installed within the case 41 may be a semiconductor device such as phototransistor or avalanche photodiode, or a light-receiving IC or CCD accompanying circuits. The adhesive 45 for bonding the case 41 and the entrance faceplate, which is a UV-bandpass filter, to each other is not limited to silicone resins, but may be inorganic soldering materials or glass materials, for example, as long as they are adhesives which do not affect the transmission of UV-rays.

The thin silver film constituting a part of the entrance faceplate may be formed on the surface opposing the photodiode 43 within the case 41 as well.

Figure 11:
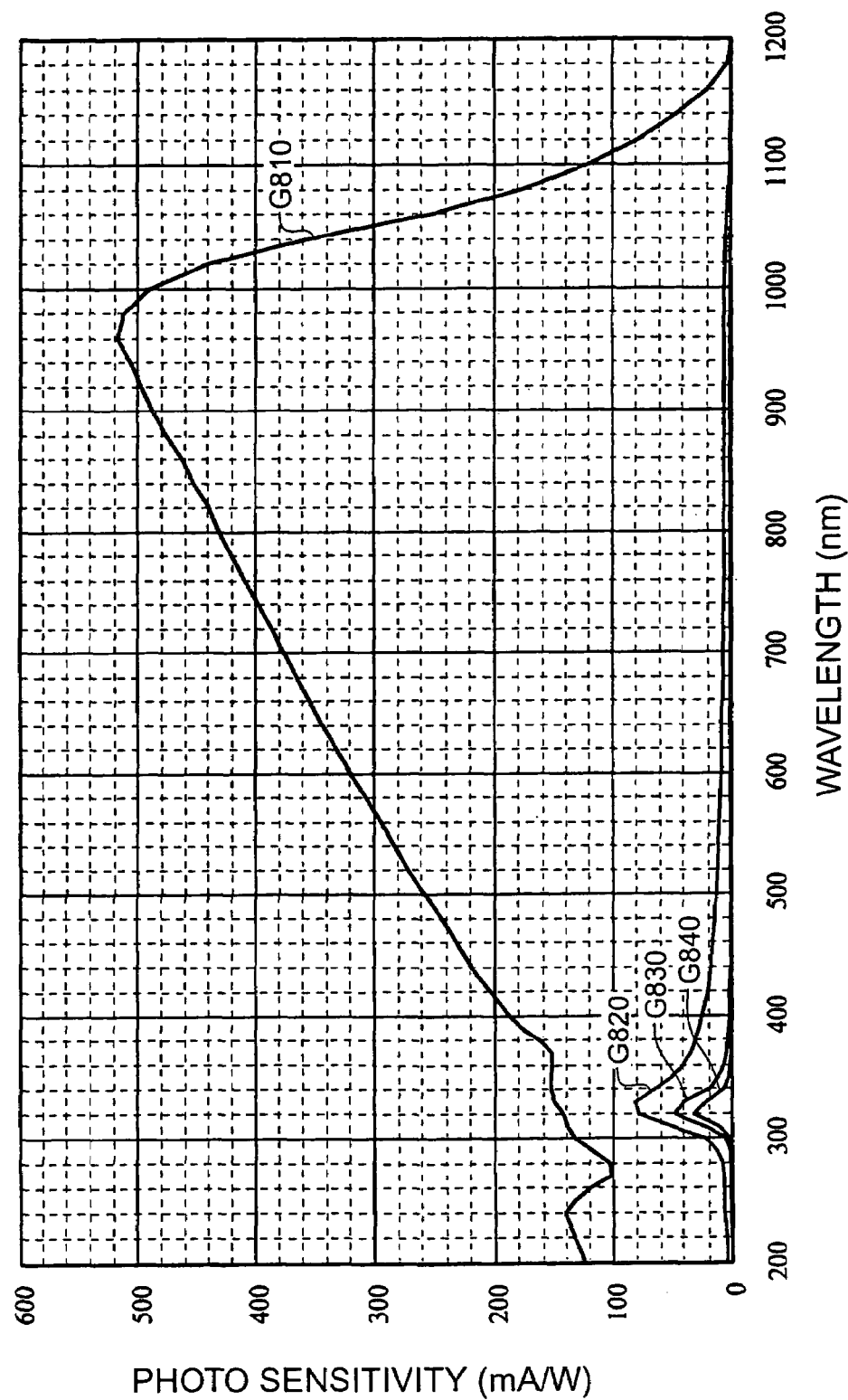
FIG. 11 is a graph showing wavelength dependence characteristics of light-receiving sensitivity in UV-detecting apparatus according to the second embodiment shown in FIG. 10B and in a conventional photodetector which is a comparative example.

FIG. 11 is a graph showing respective wavelength dependence characteristics of light-receiving sensitivity in the UV-detecting apparatus 40 having the structure shown in FIG. 10B and in a conventional photodetector (including no thin silver film as a UV-bandpass filter). In the samples prepared as the UV-detecting apparatus, thin silver films formed on the surface of silica glass 20 have thicknesses of 46.4 nm, 78.4 nm, and 106.4 nm, respectively. On the other hand, the photodiode prepared as the comparative example is a silicon photodiode.

In FIG. 11, curves G810, G820, G830, and G840 show respective wavelength dependence characteristics of light-receiving sensitivity in the silicon photodiode and in the samples formed with thin silver films having thicknesses of 46.4 nm, 78.4 nm, and 106.4 nm, respectively.

As can be seen from the graph of FIG. 11, the photodetector (silicon photodiode), which is a comparative example, has a high light-receiving characteristic in the vicinity of 1000 nm (see curve G810), whereas each of the samples having a thin silver film formed on the entrance faceplate has only one transmission peak at a wavelength of 322 nm, thereby being able to effectively block light near a wavelength of 1000 nm (see curves G820, G830, and G840). In particular, among the samples formed with thin silver films, those formed with thin respective silver films having thicknesses of 78.4 nm and 106.4 nm exhibit sufficient blocking characteristics with respect to light having wavelengths excluding the UV-region (see curves G830 and G840).

Figure 12:
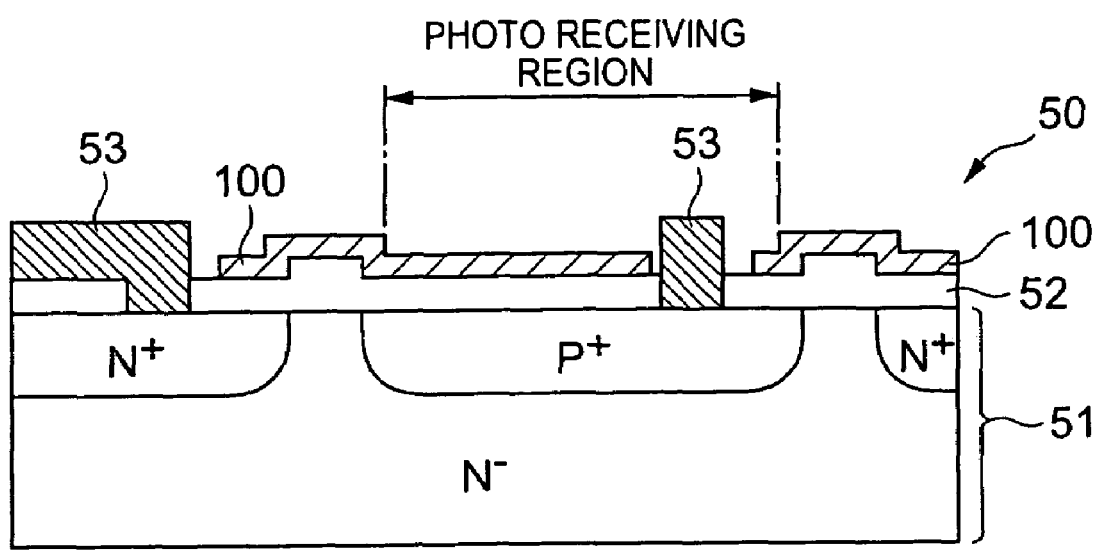
FIG. 12 is a view showing a sectional structure of a third embodiment in the UV-detecting apparatus according to the present invention.

Though the above-mentioned UV-detecting apparatus according to the second embodiment employs a UV-bandpass filter 1 having a thin silver film formed on the surface of silica glass 20 (see FIG. 2A) as an entrance faceplate, the thin silver film may directly be formed on the light-receiving face of a photodiode. FIG. 12 is a view showing the sectional structure of a third embodiment in the UV-detecting apparatus according to the present invention.

The UV-detecting apparatus 50 (photodiode) according to the third embodiment comprises a monocrystal N-type silicon substrate 51. The substrate 51 is formed with a P+ region in which impurities such as boron are injected, and an N+ region in which impurities such as phosphorus are injected, whereas the front face of the substrate 51 is formed with an insulating film (SiO$_2$ or Si$_3$N$_4$) 52 for protecting the surface of the substrate 51 and Al electrodes 53. A thin silver film 100, acting as the UV-bandpass filter according to the present invention, is directly formed on the light-receiving region of the photodiode comprising the foregoing configuration. When the UV-bandpass filter is employed in a light-receiving device made of an inexpensive silicon material as such, a UV-detecting apparatus can be obtained at a lower cost.

The insulating film 52 on the light-receiving region has a thickness regulated so as to yield a low reflectivity with respect to UV-rays, thereby improving the light-receiving sensitivity. In place of signal-taking electrodes from the N+ region of the substrate 51, an N+ layer and an Au layer may successively be formed on the rear face of the substrate 51, so that the Au layer is employed as a signal-taking electrode. Though the substrate 51 is of N type, it may be of P type as well. The substrate material is not limited to silicon, but may be a compound semiconductor such as GaAsP, for example. Though the UV-detecting apparatus according to the third embodiment is a photodiode in which a thin silver film is formed as a UV-bandpass filter, it may also have a configuration in which a thin silver film is directly formed in the light-receiving region of a light-receiving IC or CCD accompanying circuits, or a semiconductor device such as phototransistor or avalanche photodiode.

UV Source

Figure 13:
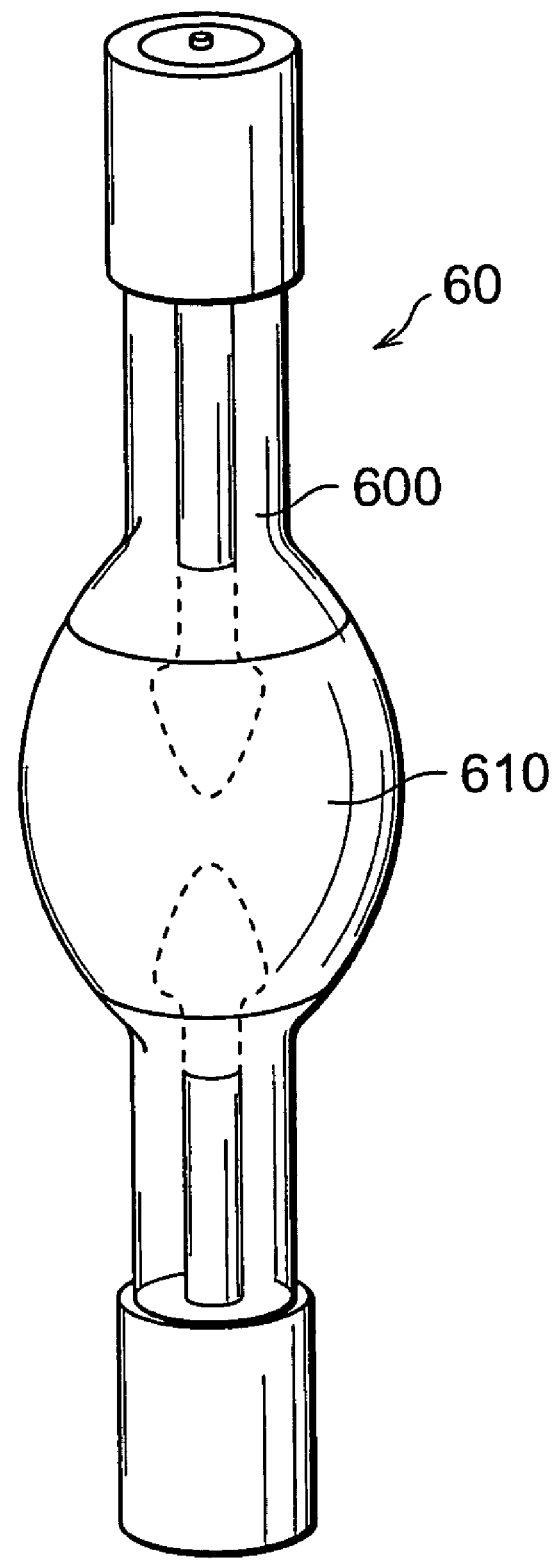
FIG. 13 is a view showing the exterior of a first embodiment (applied example of the UV-bandpass filter according to the present invention) in the light-emitting apparatus according to the present invention.

A UV source employing the UV-bandpass filter according to the present invention will now be explained. FIG. 13 is a view showing the exterior of a first embodiment in the UV source (light-emitting apparatus) according to the present invention.

The UV source 60 according to the first embodiment comprises a structure, for example, in which a thin silver film 610, which is a UV-bandpass filter according to the present invention, is directly formed on the surface of a glass envelope 600 of a xenon lamp emitting light upon discharging therewithin. The light-emitting apparatus according to the present invention is not limited to the xenon lamp as in the first embodiment, whereas UV sources can also be obtained in lamps of mercury-xenon, halogen, metal halide, and the like, for example.

Figure 14A:
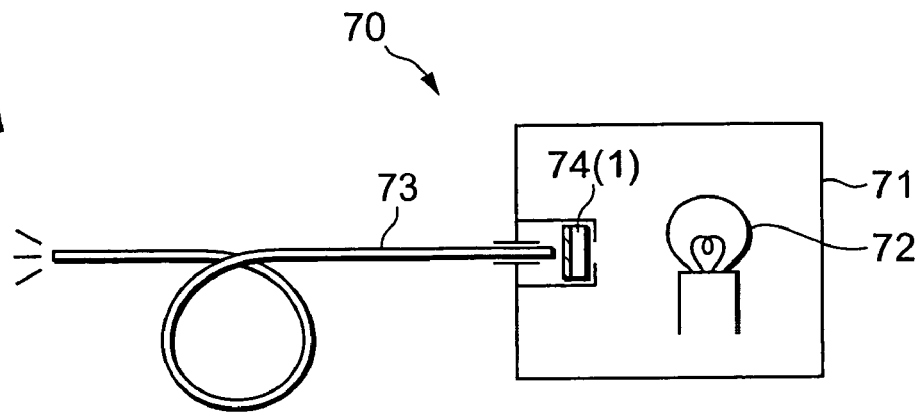
FIGS. 14A and 14B are views showing schematic configurations of second and third embodiments in the light-emitting apparatus according to the present invention, respectively.
Figure 14B:
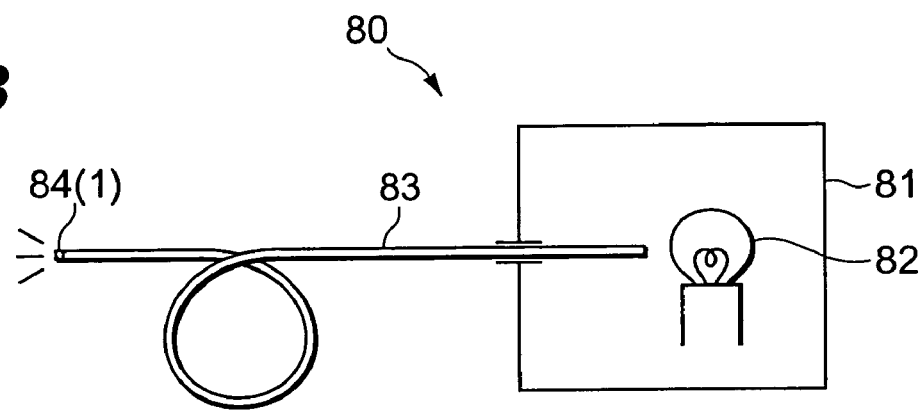

FIGS. 14A and 14B are views showing respective schematic structures of second and third embodiments in the UV source (light-emitting apparatus) according to the present invention.

As shown in FIG. 14A, the UV source 70 according to the second embodiment comprises a lamp light source 72 of xenon, mercury-xenon, halogen, metal halide, and the like, a container 71 for accommodating the lamp light source 72, and a light valve 73 such as an optical fiber having a front end part secured to the container 71, whereas a UV-bandpass filter 74 is disposed between the light entrance end of the light valve 73 and the lamp light source 72. Though the UV source 70 according to the second embodiment shows the UV-bandpass filter 74 comprising a structure similar to that of the UV-bandpass filter 1 shown in FIG. 2A, it may be a UV-bandpass filter having a structure such as one shown in FIG. 2B or 2C as well. Also, it may have a structure in which a thin silver film is directly formed at the light entrance end of the light valve 73.

As shown in FIG. 14B, the UV source 80 according to the third embodiment comprises a lamp light source 82 of xenon, mercury-xenon, halogen, metal halide, and the like, a container 81 for accommodating the lamp light source 82, and a light valve 83 such as an optical fiber having a front end part secured to the container 81, whereas a UV-bandpass filter 84 is disposed at the light exit end of the light valve 83. Though the UV source 80 according to the third embodiment also shows the UV-bandpass filter 84 comprising a structure similar to the UV-bandpass filter 1 shown in FIG. 2A, it may be a UV-bandpass filter having a structure such as one shown in FIG. 2B or 2C as well. Also, it may have a structure in which a thin silver film is directly formed at the light entrance end of the light valve 83.

Though a single silver film is employed as the thin silver film 10, which is a UV-bandpass filter, in each embodiment in the UV-bandpass filter, UV apparatus, and light-emitting apparatus according to the present invention, the thin silver film 10 also includes a film formed like an island having a gap of not greater than a wavelength of transmitted light.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the present invention, a single silver film regulated so as to have a predetermined thickness constitutes a bandpass filter having a sufficient blocking effect with respect to light having wavelengths excluding the UV-region, which is applicable to a wider range of technology when combined with conventional optical devices, and can function as a UV-bandpass filter in a wider wavelength band when the film thickness of the thin silver film is regulated to 70 nm or more, preferably 80 nm or more, but 250 nm or less.

The invention claimed is:

1. A UV-bandpass filter for selectively transmitting light having a wavelength included in a specific UV region of 200 nm to 400 nm, comprising:

a UV-transmitting member that is transparent to at least the light included in said specific UV region; and a thin silver film having an entrance face and an exit face that opposes said entrance face and that is in direct contact with one surface of said UV-transmitting member, said thin silver film having such a total thickness of at least 80 nm but not greater than 250 nm, as to make the ratio of power of light transmitted from said exit face to power of light incident upon said entrance face be not greater than 10% at any wavelength in a wavelength region of 400 nm to 3000 nm.

2. The UV-bandpass filter according to claim 1, wherein the ratio of the total power of the light excluding said specific UV-region, which is included in the light transmitted from said exit face, to the total power of the light transmitted from said exit face is not greater than 10%.

3. A UV-detecting apparatus including the UV-bandpass filter according to claim 1.

4. A light-emitting apparatus including the UV-bandpass filter according to claim 1.

5. The UV bandpass filter according to claim 1, wherein said thin silver film includes a plurality of silver layers constituting a laminate structure.

* * * * *